United States Patent Office 2,840,810
Patented June 24, 1958

2,840,810
BORE SIGHTING ERROR DETECTOR

Edwin M. Bailey, Jr., Stamford, Conn., assignor, by mesne assignments, to the United States of America as represented by the Secretary of the Navy Application May 8, 1946, Serial No. 668,028

3 Claims. (Cl. 343—17.7)

This invention relates to electrical apparatus and more particularly to a detecting system for measuring boresighting errors in radar controlled gun-laying equipment.

In radar controlled gun-laying equipment, a transmitter sends out a series of high frequency pulses using a parabolic reflector as a radiating element to cause conical scanning of the radiation pattern. In a conical scan system the axis of the radiated beam describes a cone in space. A target in the zone covered by the searching beam reflects a signal which is picked up by the same antenna. The scanning of the radar beam produces a modulation of the reflected signal, the amplitude of which indicates how far the target is off the axis of the spinning antenna, and the scanning phase of which determines the direction in which the target is off the axis of the antenna. Suitable receiving and tracking units are employed to adjust the position of the antenna so that its axis points directly at the target causing the fundamental modulation of the signal reflected from the target to go to zero. The guns of the system are mechanically linked to the antenna in such a manner that the guns are at all times pointing in the same direction as the axis of the radar antenna. In addition, the system has a tracking and amplifier system following the receiver of the radar system which analyzes this fundamental modulation both in amplitude and phase, and presents this information on a cathode-ray tube indicator which shows range and angular deviation of the chosen target. This type of indicator conveys to the gunner the required information for firing the guns at the proper time.

However, reflections set up during the scanning of the antenna cause "pulling" of the transmitter power and frequency. "Pulling" is the term applied to external factors affecting the amplitude and frequency of the electromagnetic energy generated in the transmitter. This pulling effect causes returned signals to be modulated even when the target is directly on the axis of the radar scan. Since the tracking system acts to position the antenna as long as there is a modulating signal, an error in the pointing of the antenna, and hence its associated guns, results. It is desirable to determine the magnitude and direction of this boresighting error due to pulling, so that corrections can be applied to the mounting of the guns relative to the antenna to overcome this error.

Accordingly, the primary object of the present invention is to provide a method of measuring boresighting errors due to frequency and amplitude pulling of the radar transmitter used in gun-laying radar systems.

Another object of the present invention is to provide electronic apparatus to measure bearing deviation caused by pulling of transmitter frequency in radar controlled gun-laying systems.

A further object of the present invention is to provide a method of determining the filtering action of a T-R box, or transmit-receive switch.

The foregoing and other objects of the present invention will be apparent from the detailed description when taken with the accompanying drawings in which.

Figure 1:
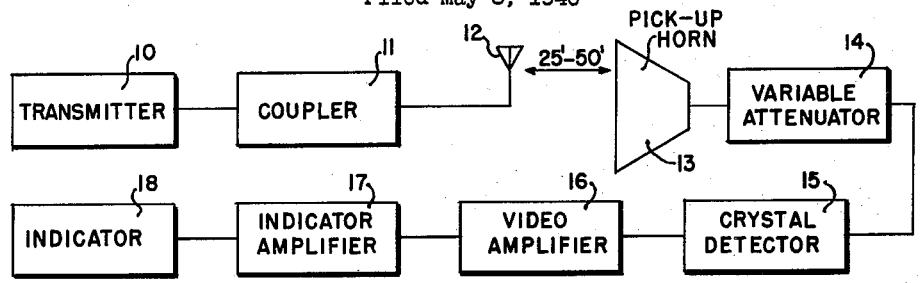
Figure 1 is a block diagram of a typical boresighting apparatus suitable for calibrating the components used in measuring boresighting errors.

Referring to Figure 1, the system to be tested consists of a transmitter 10, a directional coupler 11, and directional spinner antenna 12. The test equipment to be calibrated consists of a pick-up horn 13, attenuator 14, crystal detector 15, video amplifier 16, an indicator-amplifier 17 of the same model as used with the transmitter to complete the gun-laying system, and a radar indicator 18 such as that described above. The purpose of this apparatus is to determine the sensitivity in mils angular deviation per inch deflection on the indicator screen. Sensitivity is determined by moving the antenna assembly by a known angle while pointing at a target. The target in this case is pick-up horn 13 located between 25 and 50 feet from the antenna, which feeds into attenuator 14 and crystal detector 15. The output of the detector is put through video amplifier 16, and indicator-amplifier 17 analyzes the amount of modulation which results from pointing the antenna off target. The amount of deflection of the spot on the face of indicator 18 is compared with the known angular shift of the radar antenna which gives the mils per inch sensitivity of the apparatus. Indicator 18 is a conventional cathode ray tube but as used in the present test system its sweep voltages are disabled so that its beam deflection is solely under the control of a pair of D. C. voltages applied to the horizontal and vertical deflecting electrodes. It will be appreciated that to obtain the necessary spot deflection the output of indicator-amplifier 17 must be compared in amplitude and phase with a standard reference signal, which signal may be simply derived from the mechanism that accomplishes the scanning of antenna 12. For example, the output of a rotary transformer driven from the antenna scanning apparatus can serve as this reference signal.

The present invention provides a method by which the components described above are utilized for detecting boresighting errors due to frequency and amplitude pulling of the transmitter power. Again, referring to Figure 2, the system under investigation consists of transmitter 20 and directional antenna 21. A directional coupler 22 is used to sample power from transmitter 20, which may or may not be pulled in frequency or amplitude due to varying reflection from antenna 21. Antenna 21 is pointed into free space with no targets in the vicinity so that no modulation will result from energy being returned from a target. Energy from directional coupler 22 feeds through attenuator 23, crystal detector 24, video amplifier 25, and then into the analyzing amplifier 26 and indicator 27 of the gun directing system. It is important that attenuator 23 be adjusted such that the signal is not so strong as to cause crystal or amplifier saturation which would result in a loss of modulation indication. Indicator-amplifier 26 analyzes the amount of modulation due to pulling, and the boresighting error which results is indicated by the amount of deflection of the spot on indicator 27, the sensitivity of which was determined as described above with reference to Figure 1. Since the antenna is pointed into space free from targets, if there is no indication of modulation, there is no pulling. If pulling is present, the boresighting error caused by it can be determined and corrective steps can be taken to overcome the error.

Figure 2:
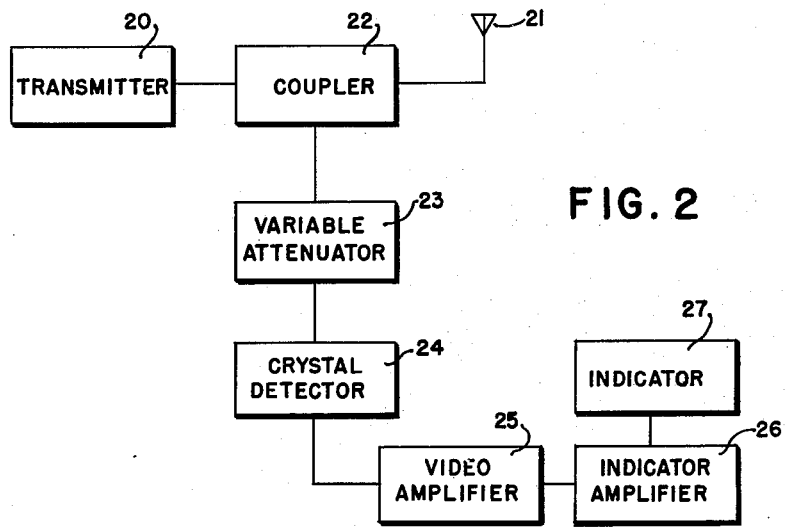
Figure 2 is a block diagram of the circuit consisting of Figure 1 as applied for the measurement of boresighting errors.

It will be seen from the above that the equipment of Fig. 1 is used solely to calibrate the cathode ray tube indicator, and any effects of transmitter pulling are compensated for in the initial balancing of the system. The circuit of Fig. 2 is similar to that of Fig. 1 except for the fact that the indicator 27 is directly supplied with a portion of the transmitted power by means of the performance of directional coupler 22. It should be appreciated that the components of Fig. 1 are conventional radar assemblies which are interconnected for the purpose of calibrating indicator 18. Presumably, the calibration of indictor 18 applies with almost equal accuracy to similar indicators. If one adopts this position, Fig. 2 may represent a different radar system. However, there is no reason why the components of Figs. 1 and 2 cannot be the same, that is, the cathode ray tube of a particular radar system can be calibrated by the method shown in Fig. 1 and then this system tested for pulling by the arrangement of Fig. 2. In the latter case, of course, it is only necessary to feed first the crystal detector from a directional horn illuminated by the scanning beam and then from a directional coupler inserted between the transmitter and the antenna.

Figure 3:
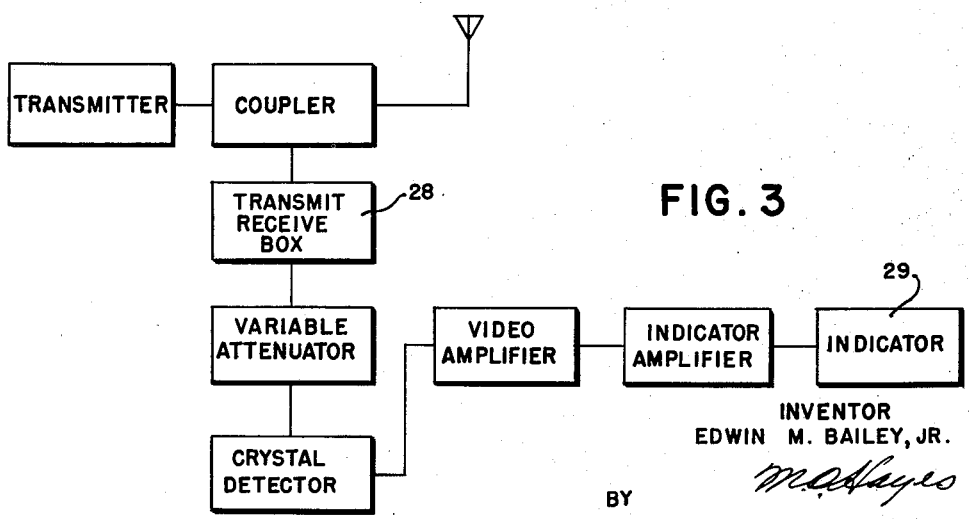
Figure 3 is the system of Figure 2 including a T-R box or transmit-receive switch.

A further application of this procedure is to determine the effect of the filtering action of a transmit-receive switch, which is commonly known in the art as a T-R box. In Figure 3, a T-R box 28 is shown inserted between the directional coupler and the attenuator of the circuit described in connection with Figure 2. When the T-R box is detuned, the spot deflection on indicator 29 changes because frequency pulling is turned into change in amplitude, since the attenuation through the T-R box changes with frequency.

The procedure outlined in the foregoing specification need not be limited to the applications mentioned which are considered as illustrative of a form the invention may take.

What is claimed is:

1. A circuit for determining the filtering action of a transmit-receive switch as used in radar systems comprising, a directional coupler coupled to said radar system for sampling power from each transmission of said radar system transmitter, the output of said coupler being coupled to the input of said transmit-receive switch, detecting means, variable attenuating means coupling said detecting means to the output of said transmit-receive switch, a modulation detector circuit coupled to said detecting means through an amplifying means, said modulation detector circuit being adapted to produce an output proportional to the modulation in said power sample, and a cathode ray tube indicator coupled to the output of said modulation detector circuit.

2. A circuit for determining the error introduced by a transmit-receive switch used in a radar system including a transmitter and an antenna coupled to said transmitter, said circuit comprising a directional coupler coupled to said radar system at a point intermediate said transmitter and said antenna, said directional coupler sampling power from each transmission of said radar system transmitter, a transmit-receive switch coupled at its input to the output of said directional coupler, a variable attenuator, means coupled by said attenuator to the output of said transmit-receive switch for detecting the signal from said transmit-receive switch while preserving the amplitude modulation present thereon, a modulation detector circuit coupled to said detecting means, said modulation detector circuit being adapted to produce an output proportional to said amplitude modulation and an indicator coupled to said modulation detector circuit for indicating the amplitude of the output therefrom.

3. A circuit for detecting frequency and amplitude modulation of the transmitted signal in a conically scanning radar system including at least a transmitter and an antenna, said circuit comprising a directional coupler coupled to said radar system intermediate said transmitter and said antenna, said directional coupler sampling power from each transmission of said radar system transmitter, a variable attenuator coupled to the output of said directional coupler for reducing the magnitude of said power sample, means coupled to the output of said variable attenuator for detecting the signal from said attenuating means while preserving the amplitude modulation present thereon, a modulation detecting means, said modulation detecting means being adapted to produce an output proportional to said amplitude modulation and an indicator coupled to said modulation detecting means for indicating the amplitude of the output therefrom.

References Cited in the file of this patent

UNITED STATES PATENTS

| | | |
|---|---|---|
| 1,924,174 | Wolf | Aug. 29, 1933 |
| 2,050,418 | Boerner | Aug. 11, 1936 |
| 2,268,643 | Crosby | Jan. 6, 1942 |
| 2,418,143 | Stodola | Apr. 1, 1947 |
| 2,479,222 | Edlen | Aug. 16, 1949 |
| 2,505,525 | Clapp | Apr. 25, 1950 |
| 2,532,539 | Counter | Dec. 5, 1950 |
| 2,549,385 | Rapuano | Apr. 17, 1951 |